(12) United States Patent
Molnos (10) Patent No.: US 10,908,675 B2
(45) Date of Patent: Feb. 2, 2021

(54) ELECTRONIC DEVICE FOR SIGNAL PROCESSING WITH EMBEDDED OPTIMIZATION OF ELECTRICAL ENERGY CONSUMPTION AND A CORRESPONDING METHOD

(71) Applicant: COMMISSARIAT A L'ENERGIE ATOMIQUE ET AUX ENERGIES ALTERNATIVES, Paris (FR)

(72) Inventor: Anca Molnos, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 118 days.

(21) Appl. No.: 16/220,196

(22) Filed: Dec. 14, 2018

(65) Prior Publication Data

US 2019/0187778 A1    Jun. 20, 2019

(30) Foreign Application Priority Data

Dec. 15, 2017   (FR) ...................................... 17 62299

(51) Int. Cl.
*G06F 1/00* (2006.01)
*G06F 1/3296* (2019.01)
(Continued)

(52) U.S. Cl.
CPC ............ *G06F 1/3296* (2013.01); *G06F 1/324* (2013.01); *G06F 1/3206* (2013.01); *G06N 20/00* (2019.01); *G06F 1/3203* (2013.01)

(58) Field of Classification Search
USPC ......................................................... 713/300
See application file for complete search history.

(56) References Cited

U.S. PATENT DOCUMENTS 9,189,730 B1 * 11/2015 Coenen .................. G06N 3/049
2009/0099985 A1 * 4/2009 Tesauro .................... G06N 5/02
706/12

(Continued)

OTHER PUBLICATIONS

French Preliminary Search Report dated Aug. 31, 2018 in French Application 17 62299, filed on Dec. 15, 2017 (with English Translation of Categories of Cited Documents & Written Opinion).

(Continued)

*Primary Examiner* — Volvick Derose
(74) *Attorney, Agent, or Firm* — Oblon, McClelland, Maier & Neustadt, L.L.P.

(57) ABSTRACT

This electronic device for signal processing with embedded optimization of electrical energy consumption includes: at least one sensor and at least one actuator; hardware for storing at least one correspondence table assigning a quality value to each pair formed by a state value measurable by each sensor and an action value adjustable by each actuator; processing hardware comprising an electrical energy consumption manager with a reinforcement learning engine designed to selectively choose between an exploitation and a random exploration in each correspondence table so as to select a new action and transmit it to each actuator. The learning reinforcement engine has a random exploration limit parameter, comprising an exploration distance value in each correspondence table, around a pre-selectable action value in each correspondence table.

20 Claims, 2 Drawing Sheets

(51) Int. Cl.
  *G06F 1/324* (2019.01)
  *G06N 20/00* (2019.01)
  *G06F 1/3206* (2019.01)
  *G06F 1/3203* (2019.01)

(56) References Cited

U.S. PATENT DOCUMENTS

| | | | |
|---|---|---|---|
| 2014/0249676 A1* | 9/2014 | Florencio | G06N 3/008 700/259 |
| 2017/0031430 A1* | 2/2017 | Ansorregui | G06F 1/3203 |
| 2017/0205863 A1* | 7/2017 | Lee | G06F 1/3206 |
| 2018/0114137 A1* | 4/2018 | Ferreira Moreno | G06N 3/008 |
| 2019/0184564 A1* | 6/2019 | Muraoka | B23P 19/04 |
| 2019/0378036 A1* | 12/2019 | Tuzi | B60W 50/0097 |

OTHER PUBLICATIONS

Molnos, A., et al. "Investigation of Q-learning applied to DVFS management of a System-on-Chip", IFAC-PapersOnLine, vol. 49, No. 5, 2016, 7 pages.

Mann, T., et al. "Scaling Up Reinforcement Learning through Targeted Exploration", Proceedings of the Twenty-Fifth AAAI Conference on Artificial Intelligence, 2011, 6 pages.

Dean, T., et al. "Planning Under Time Constraints in Stochastic Domains", Artificial Intelligence, vol. 76, No. 1-2, 1995, 54 pages.

* cited by examiner

ELECTRONIC DEVICE FOR SIGNAL PROCESSING WITH EMBEDDED OPTIMIZATION OF ELECTRICAL ENERGY CONSUMPTION AND A CORRESPONDING METHOD

The present invention relates to an electronic device for processing signals with embedded optimization of electrical energy consumption. It also relates to a method for optimizing the electrical energy consumption of such a device.

It applies in particular to electronic devices with embedded computing, such as integrated circuits, systems-on-chip (SoC), central or graphics processing units, or more generally to computers and servers of interconnected computer networks, when they comprise:
- at least one sensor designed to measure, at each of a plurality of successive times, a state value of the electronic device,
- at least one actuator designed to adjust, at each of the plurality of successive times, an action value on the electronic device, and
- signal processing hardware comprising an electrical energy consumption manager.

Numerous electronic devices, and in particular those with embedded computation, present possibilities today of automatic or semiautomatic adjustment of operating points that jointly optimize the electrical energy consumption and the computation capacities by compromise. Such operating points are, for example, actions that act on the electronic device in terms of power supply voltage and clock frequency, in particular when said device is a DVFS (dynamic voltage and frequency scaling) device. They may also concern actions involving instantaneous selection of one of several performance modes, such as: deep sleep, sleep, low power, high performance, etc. They provide the compromise automatically found by the electrical energy consumption manager between consumption (minimization of electrical energy consumption, minimization of wear of components, . . . ) and performance (maximization of computation capacities, compliance with output flow constraints, avoidance of hot spots, . . . ). Improving the simplicity and efficacy of such a manager is a problem that is technically difficult but important to solve.

The main difficulty is that of constantly adapting to variations in workload imposed on the applications run on the electronic devices. In fact, the processing operations that they perform are strongly correlated with the data and are highly dynamic. A certain number of solutions proposed in the prior art depend upon models that must be defined as precisely as possible in spite of the non-stationary nature of said processing operations. The result is that the solutions found are either approximate (simple models) or complex (technically advanced models). According to other solutions that seek to overcome the problem of dynamic adaptability without requiring a preliminary model, the electrical energy consumption manager has a learning engine, i.e. software and/or hardware means for dynamic learning of said workload variations. These other solutions are better adapted to dynamic environments.

Among the solutions without a preliminary model, some propose a method of learning by reinforcement, allowing for an indirect adaptive control of optimization actions to be performed dynamically on the electronic device. The invention applies more specifically to a device implementing such a method. This is thus the case concerned by article of Molnos et al, entitled "Investigation of Q-learning applied to DVFS management of a System-on-Chip", published in IFAC-PapersOnLine 49-5, pages 278 à 284, in 2016. According to this teaching, an electronic device for signal processing with embedded optimization of electrical energy consumption must further comprise:
- hardware for storing data and signals, comprising at least one correspondence table that, for each pair formed by one of several possible predetermined values of the measurable state and one of several possible predetermined values of the adjustable action, assigns at least one value representing an optimization of the electrical energy consumption, referred to as a quality value,
- a reinforcement learning engine designed, for each of the plurality of successive measurement and adjustment times, on the basis of the measured state, to:
  - update at least one quality value in each correspondence table, on the basis of said measured state and the action of the preceding time that led to said measured state,
  - selectively choose between the exploitation of updated quality values and a random exploration in each correspondence table, the random exploration being defined as the random selection of an action value in each correspondence table,
  - select a new action on the basis of a result of the exploitation or the exploration, and
  - transmit the value of said new action to said at least one actuator for adjustment.

The exploration is in particular essential in this type of device and must be continuous. It makes it possible to reduce the risk of converging to a local optimization, but it is also capable of significantly slowing the convergence to the desired global optimization. In practice, it is, for example, generally necessary to explore, multiple times, all of the correspondence table(s) to avoid local optimizations and converge to the global optimization, in accordance with an ε-greedy approach generally chosen. Parameters for updating the quality values may also be adjusted in the learning engine in order to optimize the convergence, such as a learning rate or a discount factor generally predefined between 0 and 1 in a recurrence update equation. However, experience shows that these parameters are very difficult to adjust. Similarly, the initialization of the correspondence table(s) is tricky and has a strong impact on convergence.

It may thus be desirable to provide an electronic device for signal processing with embedded optimization of electrical energy consumption that makes it possible to overcome at least some of the aforementioned problems and constraints.

Therefore, an electronic device for signal processing with embedded optimization of electrical energy consumption is proposed, comprising:
- at least one sensor designed to measure, at each of a plurality of successive times, a state value of the electronic device,
- at least one actuator designed to adjust, at each of the plurality of successive times, an action value on the electronic device,
- hardware for signal and data storage, comprising at least one correspondence table that, for each pair formed by one of several possible predetermined values of the measurable state and one of several possible predetermined values of the adjustable action, assigns at least one value representing an optimization of the electrical energy consumption, referred to as a quality value,
- signal processing hardware, comprising an electrical energy consumption manager with a reinforcement learning engine designed, at each of the plurality of successive times, on the basis of the measured state, to:
update at least one quality value in each correspondence table, on the basis of said measured state and the action of the preceding time that led to said measured state,
selectively choose between an exploitation of updated quality values and a random exploration in each correspondence table, the random exploration being defined as the random selection of an action value in each correspondence table,
select a new action on the basis of a result of the exploitation or the exploration, and
transmit the value of said new action to said at least one actuator for adjustment,
wherein the reinforcement learning engine has a parameter for limiting the random exploration, comprising an exploration distance value in each correspondence table, around a pre-selectable action value in each correspondence table, beyond which an action value cannot be selected by random exploration.

Thus, the random exploration is limited so that it slows the convergence less than in the aforementioned prior art, while still being capable of being used continuously. It has also been noted that the way in which this limitation is proposed, i.e. by a distance parameter in each correspondence table, is not particularly detrimental in terms of the search for global optimization since it ultimately turns out that, in this context of learning by reinforcement, when an optimization is global in certain vicinity correctly defined by the exploration distance value, it has a good chance of being global on the scale of the correspondence table itself. It has also been noted that the provision of this distance limitation in the exploration makes it possible to put into perspective the difficulty of adjusting other parameters such as the learning rate and the reduction factor or the sensitivity of the initialization of the correspondence table(s). This ultimately results in better convergence for better results by means of a solution that is computationally economical.

Optionally:
said at least one sensor is designed to measure, at each of the plurality of successive times, at least one scalar value of at least one measurable physical quantity of the electronic device, said at least one scalar value forming the state value of the electronic device,
said at least one actuator is designed to adjust, at each of the plurality of successive times, at least one scalar value of at least one operating parameter of the electronic device, said at least one scalar value forming the action value on the electronic device,
each correspondence table establishes a correspondence between said possible predetermined measurable state values and a plurality of possible predetermined scalar values concerning one of said at least one operating parameter for the assignment of a scalar quality value to each pair consisting of a possible predetermined measurable state value and a possible predetermined scalar value of one of said at least one operating parameter,
the random exploration is defined as being the random selection of a scalar value of each operating parameter in each correspondence table, and
for each correspondence table, the exploration distance value is defined around a pre-selectable scalar value of the corresponding operating parameter, beyond which an operating parameter scalar value cannot be selected by random exploration.

Also optionally, the possible predetermined measurable state values are ordered in each correspondence table in increasing or decreasing order of predetermined possible scalar values of one of the measurable physical quantities, and the possible predetermined scalar values concerning each of said at least one operating parameter are respectively ordered in each correspondence table in increasing or decreasing order of their effect on said possible predetermined scalar values of one of the measurable physical quantities.

Also optionally, the possible predetermined scalar values concerning each of said at least one operating parameter are respectively ordered in each correspondence table in increasing or decreasing order and have a monotonic effect on said possible predetermined scalar values of one of the measurable physical quantities.

Also optionally, the exploration distance value of each correspondence table is expressed as a number of adjacent rows or columns in said correspondence table depending on whether the predetermined possible values of the adjustable action in said correspondence table are ordered in rows or in columns.

Also optionally, said at least one sensor comprises at least one of the elements of the group consisting of:
a performance metric counter of at least one processor of the signal processing hardware,
a temperature sensor,
a voltmeter arranged to measure a power supply voltage,
a detector of the fill rate of the input/output buffer memories of at least one processor of the signal processing hardware,
a sensor of the clock frequency of at least one processor of the signal processing hardware, and
a sensor of the message output rate of the electronic device.

Also optionally, said at least one actuator comprises at least one of the elements of the group consisting of:
a device for adjusting the power of a module for cooling the electronic device,
a device for adjusting the clock frequency of at least one processor of the signal processing hardware, and
a device for adjusting a power supply voltage of the electronic device.

A method for optimizing the electrical energy consumption of an electronic device for signal processing is also proposed, comprising the following steps:
measuring, by means of at least one sensor, at each of a plurality of successive times, a state value of the electronic device,
adjusting, by means of at least one actuator, at each of the plurality of successive times, an action value on the electronic device,
storing, in signal and data storage hardware of the electronic device, at least one correspondence table that, for each pair formed by one of several possible predetermined values of the measurable state and one of several possible predetermined values of the adjustable action, assigns at least one value representing an optimization of the electrical energy consumption, referred to as a quality value,
at each of the plurality of successive times and on the basis of the measured state, activating a reinforcement learning engine of an electrical energy consumption manager of signal processing hardware of the electronic device, in order to:

update at least one quality value in each correspondence table, on the basis of said measured state and the action of the preceding time that led to said measured state, selectively choose between an exploitation of updated quality values and a random exploration in each correspondence table, the random exploration being defined as the random selection of an action value in each correspondence table, select a new action on the basis of a result of the exploitation or the exploration, and transmit the value of said new action to said at least one actuator for adjustment, wherein, when the random exploration is selected, it is limited by a parameter of the reinforcement learning engine, said parameter comprising an exploration distance value in each correspondence table, around a pre-selectable action value in each correspondence table, beyond which an action value cannot be selected by random exploration.

Optionally, the exploration distance value parameter is dynamically adjustable during execution of the reinforcement learning engine so as to increase or decrease the exploration distance in each correspondence table.

Also optionally, the pre-selectable action value in each correspondence table is associated with a maximum value of the updated quality values in said correspondence table, in particular a value resulting from the exploitation.

The invention will be better understood in view of the following description, provided solely as an example and with reference to the appended drawings, in which.

Figure 1:
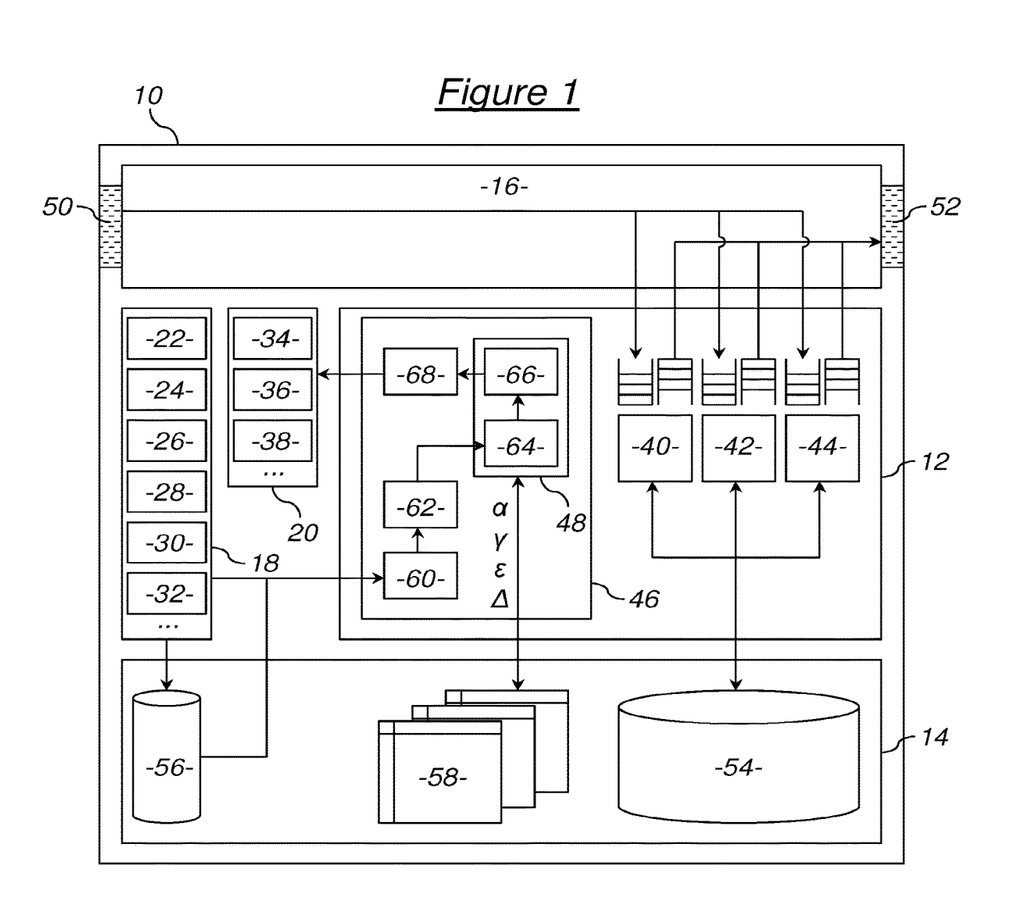
FIG. 1 schematically shows the general structure of an electronic device for signal processing with embedded optimization of electrical energy consumption, according to an embodiment of the invention.

The electronic device 10 for signal processing schematically shown in FIG. 1 functionally comprises a computation unit 12 in the form of signal processing hardware, at least one memory 14 in the form of signal and data storage hardware, an input/output interface 16 for signals to be processed or that have been processed by the computation unit 12, a group 18 of sensors designed to measure, at each of a plurality of successive times, a state value of the electronic device 10, and a group 20 of actuators designed to adjust, at each of the plurality of successive times, an action value on the electronic device 10. This functional representation does not affect the concrete architecture of the electronic device 10. In particular, the aforementioned functional elements may at least in part communicate with one another by means of one or more data transmission bus(es) (not shown), be distributed according to a system- or network-on-chip SoC/NoC architecture, or any known architecture for electronic data processing devices in the broad sense. In particular, the electronic device 10 may be an embedded computation device such as an integrated circuit, a system-on-chip SoC, a central or graphics processing unit, or more generally any computer or even a server of a network of interconnected computers.

According to the present invention, the group 18 comprises at least one sensor, each dedicated to the measurement of at least one scalar value of at least one measurable physical quantity of the electronic device 10. As shown in FIG. 1, it comprises, for example, six, including:

a performance metric counter 22 of at least one processor of the computation unit 12: it is, for example, known to measure scalar variations of a physical quantity such as a number of instructions per clock cycle or per second;

a temperature sensor 24 for measuring the scalar temperature variations of at least some of the components of the computation unit 12: these components are indeed capable of quickly increasing in temperature when they are used too heavily and must generally be cooled by integrated radiators or fans;

a voltmeter 26 provided for measuring a power supply voltage of at least some of the components of the device 10: the scalar variations of said voltage can be measured as close as possible to the electrical power supply of the device 10;

a detector 28 of the fill rate of input/output buffer memories of at least one processor of the computation unit 12: this measurement may be global or local (i.e. for each processor) and concerns the scalar variations of said fill rate;

a sensor 30 of the clock frequency of at least one processor of the computation unit 12: this measurement of scalar variations in time frequency may also be global for the computation unit 12, or specific to each processor; and a sensor 32 of the message output rate of the electronic device 10: this measurement of scalar variations in the rate is performed at the input/output interface 16.

This list is of course not exhaustive. In any event, the number of instructions per clock cycle or per second, the temperature, the power supply voltage, the buffer memory fill rate, the clock frequency and the output rate are indeed measurable physical quantities of the electronic device 10. The group of scalar values thus measured at any time forms the value, in this case the vector value, of the state of the electronic device 10 at said time.

According to the present invention, the group 20 comprises at least one actuator, each dedicated to adjusting at least one scalar value of at least one operating parameter of the electronic device 10. As shown in FIG. 1, it has, for example, three, including:

a device 34 for adjusting the power of a module for cooling the electronic device 10, for example an integrated radiator or fan as indicated above associated with the temperature measurement: this device 34 makes it possible, for example, to adjust the instantaneous scalar power value of the cooling module and can be integrated in the cooling module itself;

a clock frequency adjustment device 36 of at least one processor of the signal processing hardware: it may be a clock common to all of the processors of the computation unit 12 or clocks specific to the processors; and a device 38 for adjusting a power supply voltage of at least some of the components of the device 10: this device 38 makes it possible, for example, to adjust the instantaneous scalar voltage value of the electrical power supply and can be integrated in the electrical power supply itself.

This list is of course not exhaustive. In any event, the power of the cooling module, the clock frequency and the power supply voltage are indeed operating parameters of the electronic device 10. The group of scalar values thus adjusted at any time forms the value, in this case the vector value, of the action on the electronic device 10 at said time.

It is also noted that at least some of the operating parameters of the electronic device 10 may be strongly correlated with, or even identical to, certain measurable physical quantities. For example, the power of the cooling module adjusted by the device 34 acts directly on the temperature measured by the sensor 24. Similarly, the clock frequency which is acted on by means of the device 36 can be specifically that to be measured by means of the sensor 30. Similarly, the power supply voltage which is acted on by means of the device 38 can be specifically that to be measured by means of the voltmeter 26. Nevertheless, the sensors and the actuators should not be confused, as the first perform measurements on physical quantities with instantaneous values resulting, directly or indirectly, from the adjustments made by the second.

The computation unit 12 comprises processors, dedicated or generic, capable of carrying out microprogrammed or microwired processing operations on signals provided by the input/output interface 16. FIG. 1 shows three of them, with references 40, 42 and 44, but it is only a strictly illustrative example. Each of these three processors has a buffer memory for incoming signals to be processed provided by the input/output interface 16 and a buffer memory for outgoing processed signals intended for the input/output interface 16.

According to the present invention, the computation unit 12 further comprises an electrical energy consumption manager 46 with a reinforcement learning engine 48. Such a manager 46 may take the form of a processing hardware module, such as a processor of the same type as the other processors 40, 42, 44. It is designed, i.e. microprogrammed or microwired, to receive, at any of a plurality of successive times, the state value of the electronic device 10 measured by the sensors 22, 24, 26, 28, 30, 32 and to transmit, at any of said times as well, the adjustment value of the actuators 34, 36, 38, with the objective of optimizing the electrical energy consumption by the electronic device 10 owing to said continuous action.

The input/output interface 16 has an input port 50 for receiving signals to be processed coming from outside the electronic device 10. These signals are guided to the incoming buffer memories of the processors 40, 42, 44. The input/output interface 16 further has an output port 52 for transmitting processed signals to outside the electronic device 10. These signals are directed to the output port 52 from the outgoing buffer memories of the processors 40, 42, 44. The more detailed operation of the input/output interface 16 is well known and will not be described in further detail.

The memory 14 shown in FIG. 1 has a working zone 54 dedicated to the storage of processing signals or data of the processors 40, 42 and 44. It may also have a buffer zone 56 dedicated to the temporary storage of values measured by the sensors of the group 18. Indeed, these values can be transmitted directly to the manager 46, but can also, additionally or alternatively, be temporarily stored in the buffer zone 56, which is then readable by the manager 46.

According to the present invention, the memory 14 further has a storage zone for storing at least one correspondence table 58, which, for each pair formed by a value, potentially a vector value, among a plurality of possible predetermined values of the measurable state of the electronic device 10 and a value, also potentially a vector value, among a plurality of possible predetermined values of the adjustable action on the electronic device 10, assigns at least one value representing an optimization of the electrical energy consumption, called the quality value. It is of course assumed that the numbers of possible predetermined values for the measurable state and for the adjustable action is finite. At its simplest, a single correspondence table 58 can assign a quality value to each pair formed by a measurable state value and an adjustable action value. But given that the possible action values may be vector values, as the scalar parameters of these actions can thus be optimized independently of one another, a plurality of correspondence tables 58 can be defined and stored: each correspondence table 58 then establishes a correspondence between the possible predetermined values of the measurable state and a plurality of possible predetermined scalar values concerning one of the operating parameters of the electronic device 10 for the assignment of a scalar quality value to each pair constituted by a possible predetermined value of the measurable state and a possible predetermined scalar value of said operating parameter. In the example shown in FIG. 1, three different correspondence tables can be defined: the first for adjusting the power of the cooling module, the second for adjusting the clock frequency and the third for adjusting the power supply voltage.

It is noted that the notion of "correspondence table" must be understood in its broad sense, i.e. as a system stored in the memory 14 for establishing a correspondence, in pairs, of possible predetermined values for the measurable state and those possible for the adjustable action. It does not affect how the quality values associated with each of said pairs are represented and stored in the memory: in the form of text or table files, in one or more matrices or hypermatrices (i.e. matrices of dimensions N>2), in one or more 2-dimensional tables or tables with more than 2 dimensions, etc.

Each correspondence table 58 is used by the manager 46 and is therefore readable and writable by it in order to implement an optimization by learning with exploitation/exploration by the learning engine 48.

To this end, the manager 46 has a functional microprogrammed or microwired observation module 60 for, at any of the plurality of successive times mentioned above, observing the current state of the electronic device 10. In practice, this means that the functional observation module 60 is designed to receive, at any time, the scalar values of the physical quantities measured by the sensors 22, 24, 26, 28, 30 and 32. It can receive them directly from the group 18 or indirectly via the buffer zone 56. At each time t, these scalar values form the aforementioned state value, denoted s(t), of the electronic device 10.

The manager 46 further has a functional microprogrammed or microwired module 62 for, at any of the plurality of successive times mentioned above, computing a reward value r(t) on the basis of the state value s(t) observed by the functional module 60. The reward value r(t) can also be calculated on the basis of the preceding action value, denoted a(t−1), transmitted by the manager 46 to the group of actuators 34, 36, 38 in order to arrive at the state s(t). In general, r(t)=F[s(t), a(t−1)], with F being a heuristically defined function. There are many examples of functions F in the state of the art, defined according to measured physical quantities and/or operating parameters on which to act. A particularly simple example is provided in part 4.2 of the article by Molnos et al mentioned above, which depends only on fill values of the incoming buffer memories of the processors 40, 42, 44 of the computation unit 12, i.e. values measured by the detector 28. It could be suitable for a simple embodiment of the present invention. More generally, the objective of the function F is to predefine, according to the envisaged application context, a reward function seeking to optimize the accumulation of rewards r(t) over time, as is well known in the field of learning by reinforcement. A large number of functions for computing said cumulative reward could therefore be suitable for the present invention, in particular those taught in the state of the art.

The learning engine 48 of the manager 46 has a functional microprogrammed or microwired module 64 for, at any of the plurality of successive times mentioned above, updating each correspondence table 58 by means of a preestablished equation for updating quality values on the basis of the possible state values, possible action values, reward value r(t) calculated by the functional module 62 and parameters specific to the learning engine 48, such as the learning rate, generally denoted α, and the reduction factor, generally denoted γ, mentioned above. An example of a recurrence updating equation is provided in the article by Molnos et al mentioned above. It is consistent with a simple and effective method for learning by reinforcement, called "Q-learning", compatible with the present invention.

According to the notations defined above, the updating equation may thus have the following form:

$$Q_t(s(t-1), a(t-1)) = \begin{cases} Q_{t-1}(s(t-1), a(t-1)) + \\ \alpha[r(t) + \gamma \max_{a(t)} Q_{t-1}(s(t), a(t)) - Q_{t-1}(s(t-1), a(t-1))] \end{cases}$$

where: t is the time considered, $Q_t$ is the correspondence table considered as updated at time t, $Q_{t-1}$ is the correspondence table considered before the updating at time t, s(t−1) is the state of the electronic device at time t−1 on the basis of which the action value α(t−1) made it possible to arrive at the state s(t) observed at time t by the functional module 60, $$r(t) = F[s(t), a(t-1)], \text{ and } \max_{a(t)} Q_{t-1}(s(t), a(t))$$

is the maximum quality value in the correspondence table before updating $Q_{t-1}$ for the state s(t) observed at time t by the functional module 60.

This means that at any time, it is possible to update a quality value in each correspondence table considered: i.e. that relative to the state and the action that made it possible to arrive at the last state s(t) observed. Over time, each correspondence table in its entirety is capable of being continuously updated according to the history of the successive states and actions.

The present invention is not, however, limited to the aforementioned Q-learning method, as other known methods of learning by reinforcement may be appropriate, such as SARSA (State Action Reward State Action), addressed for example in the article by Rummery et al, entitled "On-line Q-learning using connectionist systems", published in September 1994 by the Cambridge University Engineering Department. Still other methods may be appropriate according to the targeted applications. At each time t, it is thus possible in general to update at least one quality value in each correspondence table 58 considered by learning.

The learning engine 48 of the manager 46 further comprises a functional microprogrammed or microwired module 66 for, at any of the plurality of successive times mentioned above, selecting a new action value a(t) to be transmitted to the group 20 of actuators 34, 36, 38.

As for an ε-greedy approach, the functional selection module 66 is designed to selectively choose at any time between an exploitation of updated quality values and a random exploration in each correspondence table 58. The statistical parameter ε, generally between 0 and 1, expresses the rate of explorations to be performed in the plurality of times mentioned above, 1−ε expressing the rate of exploitations to be performed in the same plurality of successive times.

A correspondence table exploitation at a time t consists in determining the maximum value among the quality values that have already been updated at least once in said correspondence table and which are associated with the measured state s(t), then in selecting the corresponding action value α(t). Given that each correspondence table 58 is advantageously initialized at minimal quality values, the exploitation in fact consists in determining the maximum value among the quality values associated with the measured state s(t) in each correspondence table. The action value a(t) selected is the value $$\text{ArgMax}_{a(t)} Q_t(s(t), a(t))$$

correspondence table.

A random exploration of the correspondence table at a time t consists in randomly selecting an action value in said correspondence table. According to the present invention and unlike in an ε-greedy approach, the functional selection module 66 is designed to limit the random exploration in each correspondence table 58 by means of an additional parameter Δ of the learning engine 48. This parameter Δ expresses an exploration distance in each correspondence table 58, around a pre-selectable action value in each correspondence table 58, beyond which an action value cannot be selected by random exploration. This limitation is shown in FIG. 2 in an example of a simple embodiment according to which the pre-selectable action value is the aforementioned value $$\text{ArgMax}_{a(t)} Q_t(s(t), a(t))$$

denoted $a_j$, which takes the maximum quality value MAX in row $s_i$=s(t) of the updated correspondence table 58. According to this simple example, the parameter Δ is expressed as an integer number of adjacent columns in the correspondence table 58, the possible predetermined values $a_1, \ldots, a_{j-\Delta}, \ldots, a_j, \ldots, a_{j+\Delta}, \ldots, a_n$ of the adjustable action in said correspondence table being ordered in n columns. More generally, the exploration distance value Δ of each correspondence table 58 is expressed as a number of adjacent rows or columns in said correspondence table 58 depending on whether the predetermined possible values of the adjustable action are ordered in rows or in columns.

It is noted that when there are multiple correspondence tables in the memory 14, in particular because the possible action values are vector values as explained above, it is possible to define an exploration distance for each of them. The random exploration is then defined as the random selection of a scalar value of each operating parameter of the electronic device 10 in each correspondence table 58, limited to an exploration distance specific to each correspondence table 58 around a pre-selectable scalar value of each operating parameter. As a reminder, this does not affect how said correspondence tables may actually be stored in the memory 14. In particular, they may be in the form of a single hypermatrix or a single table of dimensions strictly greater than 2. Similarly, the parameter Δ may be defined vectorially as the action itself.

Figure 2:
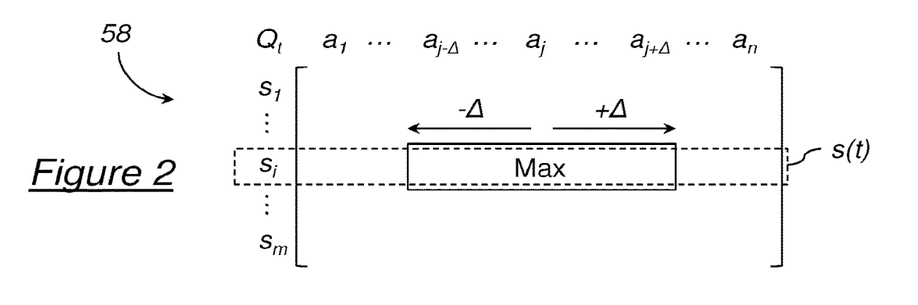
FIG. 2 shows an example of a random exploration strategy implemented by a learning engine of an electrical energy consumption manager of the device of FIG. 1.

In addition, in each correspondence table 58, the predetermined possible values of the measurable state of the electronic device 10, denoted $s_1, \ldots, s_i, \ldots, s_m$ in FIG. 2 and potentially vector values, are for example ordered in successive rows in monotonic order (increasing or decreasing) of possible predetermined scalar values of one of the physical quantities measurable by means of the group 18 of sensors 22, 24, 26, 28, 30, 32. Advantageously, the possible predetermined scalar values of the operating parameter specific to each correspondence table, denoted $a_1, \ldots, a_{j-\Delta}, \ldots, a_j, \ldots, a_{j+\Delta}, \ldots, a_n$ in FIG. 2, are then respectively ordered in successive columns in increasing or decreasing order of their effect on the scalar values ordered in rows in each correspondence table 58. Thus, the non-detrimental effect of the distance limit imposed in each correspondence table 58 for the random exploration is reinforced by the monotonic relation established between the rows ($s_1, \ldots, s_m$) and the columns ($a_1, \ldots, a_n$) of each of said tables. In other words, when an optimization is global within a certain vicinity properly defined by the exploration distance value in a correspondence table, it has a greater chance of being global on the scale of the correspondence table itself owing to said monotonic relation because the exploration distance cooperates with this monotonic relation to produce its best effects: then it all makes sense.

Preferably, it is possible to carefully choose, for each correspondence table 58, a physical value that, in principle, maintains a monotonic relation with the operating parameter specific to said table. Thus, the possible predetermined scalar values of the operating parameter specific to each correspondence table 58 are ordered in said correspondence table in increasing or decreasing order, which ensures, owing to their monotonic effect on the possible predetermined scalar values of the carefully chosen physical quantity, the desired monotonic relation between the rows ($a_1, \ldots, s_m$) and the columns ($a_1, \ldots, a_n$) of each of the correspondence tables. An exploration according to the invention therefore consists in selecting the action value a(t) in the exploration limit imposed by the pre-selectable action value and the parameter Δ.

The result is that the functional selection module 66 is designed to select, at any of the plurality of successive times mentioned above, a new action a(t) according to the result of the exploitation or the exploration as described above.

Finally, the manager 46 further has a functional microprogrammed or microwired module 68 for, at any of the plurality of successive times mentioned above, transmitting the value of said new action a(t) to the group 20 of actuators 34, 36, 38 for an instantaneous adjustment of the electronic device 10.

All or some of the elements constituting the electrical energy consumption manager 46 may fulfil their functions as described above by executing computer program instructions stored in the memory 14. These instructions can be grouped according to all possible combinations in one or more software program. As has also been indicated numerous times, their functions may also be at least partially microprogrammed or microwired in dedicated integrated circuits. Thus, the electrical energy consumption manager 46 may at least partially be implemented by software, but it may also be comprised solely of digital circuits (without a computer program) in order to perform the same actions.

Figure 3:
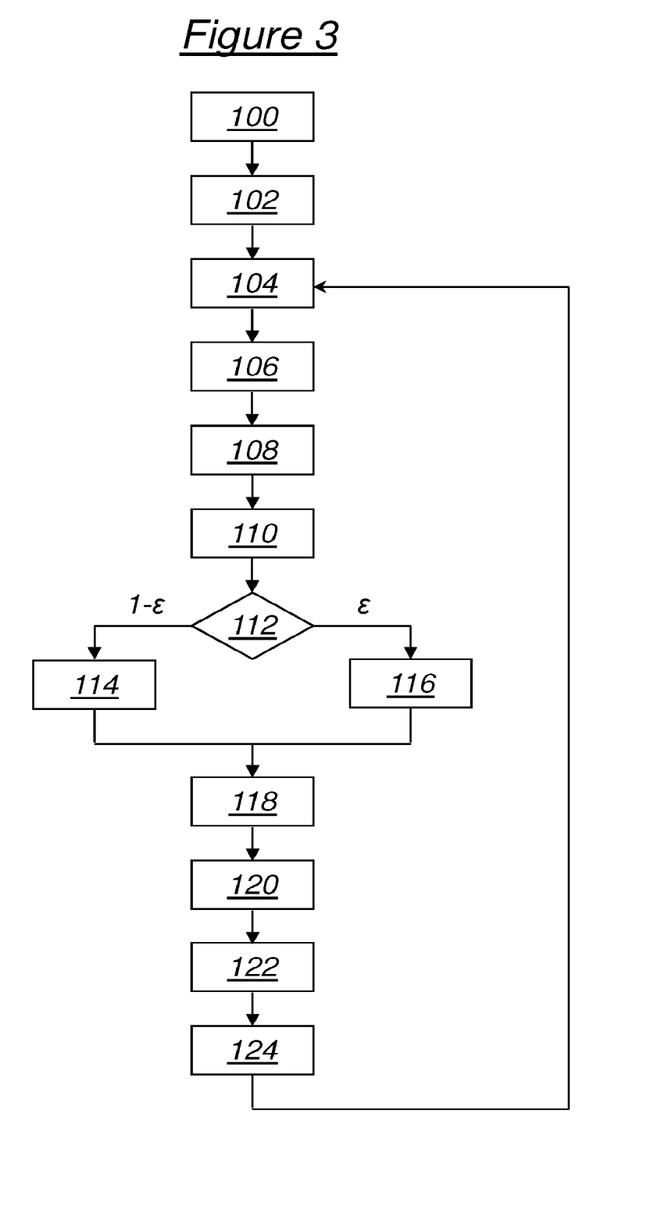
FIG. 3 shows the series of steps of a method for optimizing the consumption of electrical energy, as can be implemented by the device of FIG. 1.

The operation of the electronic device 10 in order to implement an optimization of its electrical energy consumption will now be described in reference to FIG. 3.

In a first initialization step 100, each correspondence table 58 is stored and initialized in the memory 14. The initialization can consist in setting all of the quality values to 0 if they are intended to become positive thereafter, or to other minimum values capable of positively influencing the future convergence to an optimal dynamic adaptation of the energy consumption. During this step as well, the parameters α, γ, ε and Δ of the learning engine 48 are initialized to predetermined values. As a non-limiting example, it is possible to initialize α and γ to 0.2, the ratio ε/(1−ε) to 0.8 and Δ to 2.

In a second initialization step 102, at a first time $t_0$ of a plurality of successive times t during which the operating parameters of the electronic device 10 are intended to be continuously adjusted by successive actions a(t), a first state $s(t_0)$ is observed and a first action $a(t_0)$ is defined (i.e. action of initializing the operating parameters of the electronic device 10).

Then, a loop of steps 104 to 124 is executed at each time t of the aforementioned plurality of times.

In step 104, the group 18 of sensors 22, 24, 26, 28, 30, 32 measures the current value s(t) of the state of the electronic device 10.

In the next step 106, said state value s(t) is received by the functional observation module 60, which transmits it to the functional computation module 62.

In the next step 108, the functional module 62 computes the current reward value r(t) as indicated above.

In the next step 110, the learning engine 48 is activated and its functional module 64 updates at least one quality value in each correspondence table 58 by means of the values s(t−1), a(t−1), s(t), r(t), of parameters α, γ and of a recurrence relation such as that presented above on each of said correspondence tables 58.

In the next step 112, the learning engine 48 chooses between an exploitation and a random exploration (limited by the parameter Δ) of each correspondence table 58.

If an exploitation is chosen, according to a probability 1−ε, the method goes on to step 114 of exploitation of each correspondence table 58 in accordance with what was mentioned above concerning the operation of the learning engine 48.

If a random exploration is chosen, according to a probability ε, the method goes on to step 116 of random exploration in each correspondence table 58 in accordance with what was mentioned above concerning the operation of the learning engine 48, i.e. with a limitation of the random exploration in each correspondence table 58 by means of the parameter Δ.

Each of steps 114 and 116 results in the selection by the functional module 66 of the learning engine 48 of a new action value a(t) during step 118.

In the next step 120, the functional module 68 transmits the value of said new action a(t) to the group 20 of actuators 34, 36, 38 for adjustment of the electronic device 10 by each of the actuators 34, 36, 38 in the next step 122.

Finally, in the last step 124 of the loop, the question may arise as to whether to update at least some of the parameters α, γ, ε and Δ of the learning engine 48. In particular, according to the theory of reinforcement learning methods, it may be advised to gradually decrease α and ε to 0 during the plurality of times mentioned above. Similarly, the parameter Δ may be dynamically adjustable during execution of the learning engine 48 so as to increase or reduce the exploration distance in each correspondence table 58. In particular, Δ may advantageously be gradually increased over successive times while α decreases. This gradual increase may however be stopped if, during a plurality of successive explorations, no quality value is found that is greater than that which can be determined by exploitation and around which the limited random explorations occur, given the decreasing probability of finding better quality values by distant exploration than by exploitation.

After step 124, the method returns to step 104 for a new execution of the loop of steps 104 to 124 at the next time t+1.

It clearly appears that an electronic device for signal processing with embedded optimization of electrical energy consumption as described above allows for a convergence, which is effective and low-cost in terms of computation, to an optimal dynamic adaptation of the electrical energy consumption according to variations in processing operations performed over time.

It will also be noted that the invention is not limited to the embodiment described above. It will indeed appear to a person skilled in the art that various modifications can be made to the embodiment described above, in light of the teaching just disclosed. In the presentation of the invention above, between page 3, line 24 and page 8, line 4, the terms used should not be interpreted as limiting the invention to the embodiment disclosed in the present description, but should be interpreted so as to include all equivalents within reach of a person skilled in the art applying general knowledge to the implementation of the teaching disclosed herein.

The invention claimed is:

1. An electronic device for signal processing with embedded optimization of electrical energy consumption, comprising:
   at least one sensor designed to measure, at each of a plurality of successive times, a state value of the electronic device,
   at least one actuator designed to adjust, at each of the plurality of successive times, an action value for performing an action on the electronic device,
   hardware for signal and data storage, comprising at least one correspondence table that, for each pair formed by one of several possible predetermined values ($s_1, \ldots, s_m$) of the measurable state and one of several possible predetermined values ($a_1, \ldots, a_n$) of the adjustable action value, assigns as a quality value at least one value representing an optimization of the electrical energy consumption,
   signal processing hardware, comprising an electrical energy consumption manager with a reinforcement learning engine designed, at each of the plurality of successive times, on the basis of the measured state, to:
      update at least one quality value in each correspondence table, on the basis of said measured state and the action of the preceding time that led to said measured state,
      selectively choose between an exploitation of updated quality values and a random exploration in each correspondence table, the random exploration being defined as the random selection of an action value in each correspondence table,
      select a new action on the basis of a result of the exploitation or the exploration, and
      transmit the corresponding action value of said new action to said at least one actuator for adjustment,
   wherein the reinforcement learning engine has a parameter (Δ) for limiting the random exploration, comprising an exploration distance value in each correspondence table, around a pre-selectable action value (MAX) in each correspondence table, beyond which the action value cannot be selected by random exploration.

2. The electronic device for signal processing according to claim 1, wherein:
   said at least one sensor is designed to measure, at each of the plurality of successive times, at least one scalar value of at least one measurable physical quantity of the electronic device, said at least one scalar value forming the state value of the electronic device,
   said at least one actuator is designed to adjust, at each of the plurality of successive times, at least one scalar value of at least one operating parameter of the electronic device, said at least one scalar value forming the action value on the electronic device,
   each correspondence table establishes a correspondence between said possible predetermined measurable state values ($s_1, s_m$) and a plurality of possible predetermined scalar values ($a_1, \ldots, a_n$) concerning one of said at least one operating parameter for the assignment of a scalar quality value to each pair consisting of a possible predetermined measurable state value and a possible predetermined scalar value of one of said at least one operating parameter(s),
   the random exploration is defined as being the random selection of a scalar value of each operating parameter in each correspondence table, and
   for each correspondence table, the exploration distance value is defined around a pre-selectable scalar value ($a_j$) of the corresponding operating parameter, beyond which an operating parameter scalar value cannot be selected by random exploration.

3. The electronic device for signal processing according to claim 2, wherein the possible predetermined measurable state values ($s_1, \ldots, s_m$) are ordered in each correspondence table in increasing or decreasing order of predetermined possible scalar values of one of the measurable physical quantities, and the possible predetermined scalar values ($a_1, \ldots, a_n$) concerning each of said at least one operating parameter are respectively ordered in each correspondence table in increasing or decreasing order of their effect on said possible predetermined scalar values ($s_1, \ldots, s_m$) of one of the measurable physical quantities.

4. The electronic device for signal processing according to claim 3, wherein the possible predetermined scalar values ($a_1, \ldots, a_n$) concerning each of said at least one operating parameter are respectively ordered in each correspondence table in increasing or decreasing order and have a monotonic effect on said possible predetermined scalar values ($s_1, \ldots, s_m$) of one of the measurable physical quantities.

5. The electronic device for signal processing according to claim 1, wherein the exploration distance value of each correspondence table is expressed as a number of adjacent rows or columns in said correspondence table depending on whether the predetermined possible values ($a_1, \ldots, a_n$) of the adjustable action in said correspondence table are ordered in rows or in columns.

6. The electronic device for signal processing according to claim 1, wherein said at least one sensor comprises at least one of the elements of the group consisting of:
   a performance metric counter of at least one processor of the signal processing hardware,
   a temperature sensor,
   a voltmeter arranged to measure a power supply voltage, a detector of the fill rate of input/output buffer memories of at least one processor of the signal processing hardware,
a sensor of the clock frequency of at least one processor of the signal processing hardware, and
a sensor of the message output rate of the electronic device.

7. The electronic device for signal processing according to claim 1, wherein said at least one actuator comprises at least one of the elements of the group consisting of:
a device for adjusting the power of a module for cooling the electronic device, a device for adjusting the clock frequency of at least one processor of the signal processing hardware, and
a device for adjusting a power supply voltage of the electronic device.

8. A method for optimizing the electrical energy consumption of an electronic device for signal processing, comprising:
measuring by means of at least one sensor, at each of a plurality of successive times, a state value of the electronic device,
adjusting by at least one actuator, at each of the plurality of successive times, an action value for performing an action on the electronic device,
storing, in signal and data storage hardware of the electronic device, at least one correspondence table that, for each pair formed by one of several possible predetermined values (s1, . . . , sm) of the measurable state and one of several possible predetermined values (a1, . . . , an) of the adjustable action value, assigns as a quality value at least one value representing an optimization of the electrical energy consumption,
at each of the plurality of successive times and on the basis of the measured state, activating a reinforcement learning engine of an electrical energy consumption manager of signal processing hardware of the electronic device, in order to:
update at least one quality value in each correspondence table, on the basis of said measured state and the action of the preceding time that led to said measured state,
selectively choose between an exploitation of updated quality values and a random exploration in each correspondence table, the random exploration being defined as the random selection of an action value in each correspondence table,
select a new action on the basis of a result of the exploitation or the exploration, and
transmit the corresponding action value of said new action to said at least one actuator for adjustment,
wherein, when the random exploration is selected, it is limited by a parameter ($\Delta$) of the reinforcement learning engine, said parameter comprising an exploration distance value in each correspondence table, around a pre-selectable action value (aj) in each correspondence table, beyond which the action value cannot be selected by random exploration.

9. The method for optimizing electrical energy consumption according to claim 8, wherein the exploration distance value parameter ($\Delta$) is dynamically adjustable during execution of the reinforcement learning engine so as to increase or decrease the exploration distance in each correspondence table.

10. The method for optimizing electrical energy consumption according to claim 8, wherein the pre-selectable action value (aj) in each correspondence table is associated with a maximum value (MAX) of the updated quality values in said correspondence table, in particular a value resulting from the exploitation.

11. The method for optimizing electrical energy consumption according to claim 9, wherein the pre-selectable action value (aj) in each correspondence table is associated with a maximum value (MAX) of the updated quality values in said correspondence table, in particular a value resulting from the exploitation.

12. The electronic device for signal processing according to claim 2, wherein the exploration distance value of each correspondence table is expressed as a number of adjacent rows or columns in said correspondence table depending on whether the predetermined possible values ($a_1$, . . . , $a_n$) of the adjustable action in said correspondence table are ordered in rows or in columns.

13. The electronic device for signal processing according to claim 2, wherein said at least one sensor comprises at least one of the elements of the group consisting of:
a performance metric counter of at least one processor of the signal processing hardware,
a temperature sensor,
a voltmeter arranged to measure a power supply voltage,
a detector of the fill rate of input/output buffer memories of at least one processor of the signal processing hardware,
a sensor of the clock frequency of at least one processor of the signal processing hardware, and
a sensor of the message output rate of the electronic device.

14. The electronic device for signal processing according to claim 2, wherein said at least one actuator comprises at least one of the elements of the group consisting of:
a device for adjusting the power of a module for cooling the electronic device,
a device for adjusting the clock frequency of at least one processor of the signal processing hardware, and
a device for adjusting a power supply voltage of the electronic device.

15. The electronic device for signal processing according to claim 3, wherein the exploration distance value of each correspondence table is expressed as a number of adjacent rows or columns in said correspondence table depending on whether the predetermined possible values ($a_1$, . . . , $a_n$) of the adjustable action in said correspondence table are ordered in rows or in columns.

16. The electronic device for signal processing according to claim 3, wherein said at least one sensor comprises at least one of the elements of the group consisting of:
a performance metric counter of at least one processor of the signal processing hardware,
a temperature sensor,
a voltmeter arranged to measure a power supply voltage,
a detector of the fill rate of input/output buffer memories of at least one processor of the signal processing hardware,
a sensor of the clock frequency of at least one processor of the signal processing hardware, and
a sensor of the message output rate of the electronic device.

17. The electronic device for signal processing according to claim 3, wherein said at least one actuator comprises at least one of the elements of the group consisting of:
a device for adjusting the power of a module for cooling the electronic device,
a device for adjusting the clock frequency of at least one processor of the signal processing hardware, and a device for adjusting a power supply voltage of the electronic device.

18. The electronic device for signal processing according to claim 4, wherein the exploration distance value of each correspondence table is expressed as a number of adjacent rows or columns in said correspondence table depending on whether the predetermined possible values $(a_1, \ldots, a_n)$ of the adjustable action in said correspondence table are ordered in rows or in columns.

19. The electronic device for signal processing according to claim 18, wherein said at least one sensor comprises at least one of the elements of the group consisting of:
- a performance metric counter of at least one processor of the signal processing hardware,
- a temperature sensor,
- a voltmeter arranged to measure a power supply voltage,
- a detector of the fill rate of input/output buffer memories of at least one processor of the signal processing hardware,
- a sensor of the clock frequency of at least one processor of the signal processing hardware, and
- a sensor of the message output rate of the electronic device.

20. The electronic device for signal processing according to claim 19, wherein said at least one actuator comprises at least one of the elements of the group consisting of:
- a device for adjusting the power of a module for cooling the electronic device,
- a device for adjusting the clock frequency of at least one processor of the signal processing hardware, and
- a device for adjusting a power supply voltage of the electronic device.

* * * * *